(12) United States Patent
Danilov et al.

(10) Patent No.: US 11,579,800 B2
(45) Date of Patent: Feb. 14, 2023

(54) INPUT / OUTPUT LOAD BALANCING IN A DATA STORAGE SYSTEM

(71) Applicant: EMC IP Holding Company LLC, Hopkinton, MA (US)

(72) Inventors: Mikhail Danilov, Saint Petersburg (RU); Konstantin Buinov, Prague (CZ)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 23 days.

(21) Appl. No.: 16/887,159

(22) Filed: May 29, 2020

(65) Prior Publication Data

US 2021/0373807 A1 Dec. 2, 2021

(51) Int. Cl.
*G06F 3/06* (2006.01)

(52) U.S. Cl.
CPC .......... *G06F 3/0659* (2013.01); *G06F 3/0611* (2013.01); *G06F 3/0653* (2013.01); *G06F 3/0673* (2013.01)

(58) Field of Classification Search
CPC ........... G06F 3/06–0689; G06F 3/0659; G06F 3/0611; G06F 3/0653; G06F 3/0673
See application file for complete search history.

(56) References Cited

U.S. PATENT DOCUMENTS

| | | | |
|---|---|---|---|
| 2007/0016726 A1* | 1/2007 | Zohar | G06F 11/3433 711/114 |
| 2011/0246550 A1* | 10/2011 | Levari | G06F 16/24556 709/201 |
| 2013/0346708 A1* | 12/2013 | Nashimoto | G06F 3/061 711/162 |
| 2018/0181475 A1* | 6/2018 | Danilov | H03M 13/3761 |
| 2018/0285012 A1* | 10/2018 | Kazama | G06F 3/0631 |

OTHER PUBLICATIONS

Ou, Jiaxin, et al. "EDM: An endurance-aware data migration scheme for load balancing in SSD storage clusters." 2014 IEEE 28th International Parallel and Distributed Processing Symposium. IEEE, 2014. (Year: 2014).*

Yin, Shu, et al. "DuoFS: A hybrid storage system balancing energy-efficiency, reliability, and performance." 2018 26th Euromicro International Conference on Parallel, Distributed and Network-based Processing (PDP). IEEE, 2018. (Year: 2018).*

* cited by examiner

*Primary Examiner* — Nicholas J Simonetti

(74) *Attorney, Agent, or Firm* — Amin, Turocy & Watson, LLP

(57) ABSTRACT

The described technology is generally directed towards an input/output (I/O) load balancer of a data storage system that detects an I/O overloaded ("hot") storage unit and logically moves its hot data to a non-overloaded ("cold") storage unit. Threshold load levels can be used to determine hot and cold storage units. In one implementation, new writes to the hot storage unit are prevented while its hot data is logically moved to a cold storage unit. To avoid reads from the hot storage unit, the hot data can be recreated from redundant data obtained via a recovery path. To avoid a capacity imbalance, once enough hot data has been moved so that the (formerly) hot storage device is no longer considered hot, cold data from the cold storage device can be written to the formerly hot storage device. New data writes to the formerly hot storage device can then resume.

20 Claims, 11 Drawing Sheets

INPUT / OUTPUT LOAD BALANCING IN A DATA STORAGE SYSTEM

TECHNICAL FIELD

The subject application relates generally to data storage, and, for example, to a technology that facilitates input/output (I/O) load balancing data for storage units of a data storage system, and related embodiments.

BACKGROUND

Contemporary data storage systems, such as Dell EMC®'s ECS (formerly Elastic Cloud Storage) service, store data in a way that ensures data protection while retaining storage efficiency. For additional protection of user data and metadata, ECS supports geographically distributed setups of multiple zones (geographically distributed node clusters), with the data and metadata of one zone distributed and replicated to two or more zones by asynchronous replication.

Such storage systems can be considered as a hierarchy of storage units; there can be different zones/node clusters with nodes hierarchically under each node cluster. In turn, each node of a node cluster is hierarchically above its storage devices, generally disks.

Such hierarchical systems use capacity load balancing techniques to assure more or less even distribution of data among storage units at one level, that is, at the clusters/nodes/disks levels. However, in general, such capacity load balanced storage systems do not perform satisfactory I/O (input/output) load balancing. For instance, I/O load balancing can be performed by round robin; however there is often little benefit from round robin I/O load balancing (as well as other known I/O load balancing mechanisms). This is because user data normally has just one copy (albeit protected) within a system, and if that user data is on a "hot" disk that is being overwhelmed with I/O requests, significant delays result, adversely impacting the data storage system's overall performance characteristics severely.

Significant I/O imbalance across storage units may result in such hot spots. There may be several causes for a significant I/O imbalance, including specific data access patterns, expansion of a storage system, storage unit replacement, specific features of capacity load balancing, and/or a combination of any of these causes.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
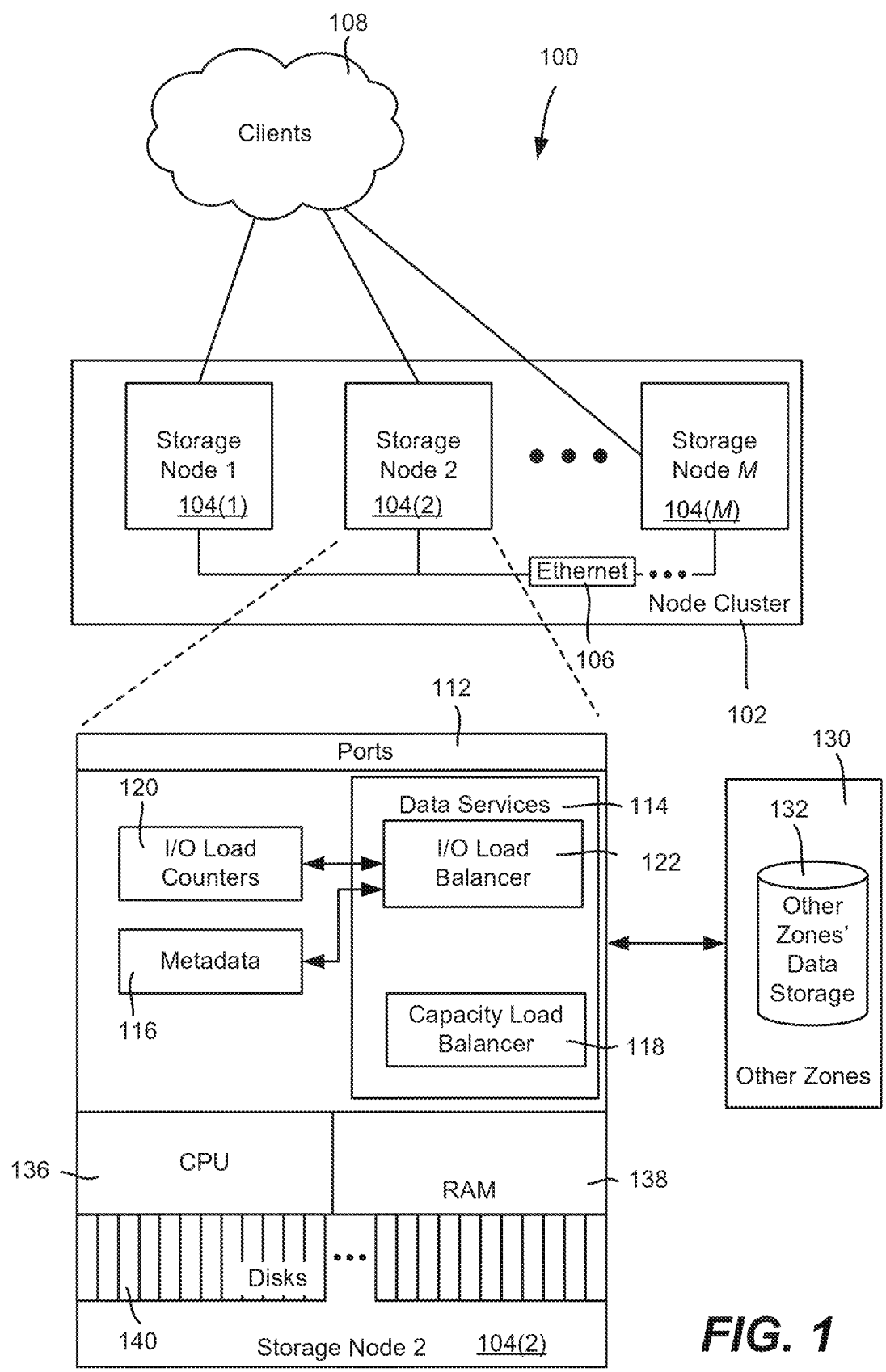
FIG. 1 is an example block diagram representation of part of a data storage system including nodes and geographic zones, in which I/O load balancing can be performed, in accordance with various aspects and implementations of the subject disclosure.

Various aspects of the technology described herein are generally directed towards I/O load balancing for peer storage units at different system levels (e.g., clusters/nodes/disks) based on detecting heavily I/O loaded "hot" storage units, and transferring at least some of the I/O load to a less heavily I/O loaded "cold" storage unit. As will be understood, data maintained on a hot storage unit can be swapped to a cold storage unit, often without needing a data read from the hot storage unit, by attempting to obtain (recreate) the data from a recovery path, as if the data was lost or corrupted, for example. Further, data writes to a hot storage unit can be prevented until the hot storage unit is no longer hot.

As will be understood, the technology is compatible with conventional capacity load balancing mechanisms. To this end, instead of only transferring data from a hot storage unit to a cold storage unit, some data from the cold storage unit can be swapped back to the hot storage unit. In this way, a capacity load balancer does not detect the formerly hot storage unit as now being under-loaded, which can cause the capacity load balancer to direct new, potentially hot data to the formerly hot storage unit making it a hot storage unit once again.

It should be understood that any of the examples herein are non-limiting. For instance, some of the examples are based on ECS data storage technology; however virtually any storage system may benefit from the technology described herein. As a more particular example, the term "chunk" can be used as an example of a unit of data storage, however any data block can be used in other storage systems. Still further, the technology described herein is not limited to geographic zones, but can be used with any requests for data received at a server or the like that can be handled by rerouting requests and processing related data to obtain the requested data. Thus, any of the embodiments, aspects, concepts, structures, functionalities or examples described herein are non-limiting, and the technology may be used in various ways that provide benefits and advantages in computing and data storage in general.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

FIG. 1 shows part of a data storage system 100 (such as ECS) comprising a node cluster 102 of storage nodes 104(1)-104(M), in which each node is typically a server configured primarily to serve objects in response to client requests. The nodes 104(1)-104(M) are coupled to each other via a suitable data communications link comprising interfaces and protocols, such as represented in FIG. 1 by Ethernet block 106.

Clients 108 make data system-related requests to the cluster 102, which in general can be configured as one large object namespace; there may be on the order of billions of objects maintained in a cluster, for example. To this end, a node such as the node 104(2) (shown enlarged in FIG. 1 as well) generally comprises ports 112 by which clients connect to the cloud storage system. Example ports are provided for requests via various protocols, including but not limited to SMB (server message block), FTP (file transfer protocol), HTTP/HTTPS (hypertext transfer protocol) and NFS (Network File System); further, SSH (secure shell) allows administration-related requests, for example.

Each node, such as the node 104(2), includes an instance of a data storage system and data services 114; (note however that at least some data service components can be per-cluster, rather than per-node, and possibly per-sub-group of nodes). For example, ECS runs a set of storage services, which together implement storage logic. Services can maintain directory tables for keeping their metadata (e.g., as represented in FIG. 1 by block 116) which can be implemented as search trees. A blob service maintains an object table (e.g., in various partitions among nodes, including geographically separated zones) that keeps track of objects in the data storage system and generally stores their metadata, including an object's data location information, e.g., within a chunk. The blob service also maintains a listing table, although it is alternatively feasible to have such a listing table maintained by another service.

The data services 114 can include or be coupled to a capacity load balancer 118. A capacity load balancer can be implemented per-node to capacity load balance disks, per cluster to capacity load balance nodes, per subgroups of nodes, and so on. A node can contain the capacity load balancer(s) or a dedicated device can be used for capacity load balancing, e.g., above the node level.

As described herein, based on information obtained from I/O load detectors, which can comprise I/O load counters 120, an I/O load balancer 122 can detect overloaded (hot disks) and disks that are relatively cold disks. An I/O load balancer can be implemented per-node to I/O load balance disks, per cluster to I/O load balance nodes (or per subgroups of nodes), and/or system wide to I/O load balance node clusters.

In one or more implementations, the data services 114 can also be coupled via geographic-related services to other zones, such as replication-related communications to and from remote zones 130 and their data storage 132. In FIG. 1, a CPU 136 and RAM 138 are shown for completeness; note that the RAM 138 may comprise at least some non-volatile RAM. The node 104(2) further includes storage devices such as disks 140, comprising hard disk drives and/or solid-state drives, or any other suitable type of storage resource. As can be readily appreciated, components of the data storage system including those described herein can be at various times in any storage device or devices, such as in the RAM 138, in the disks 140, or in a combination of both, for example.

Figure 2:
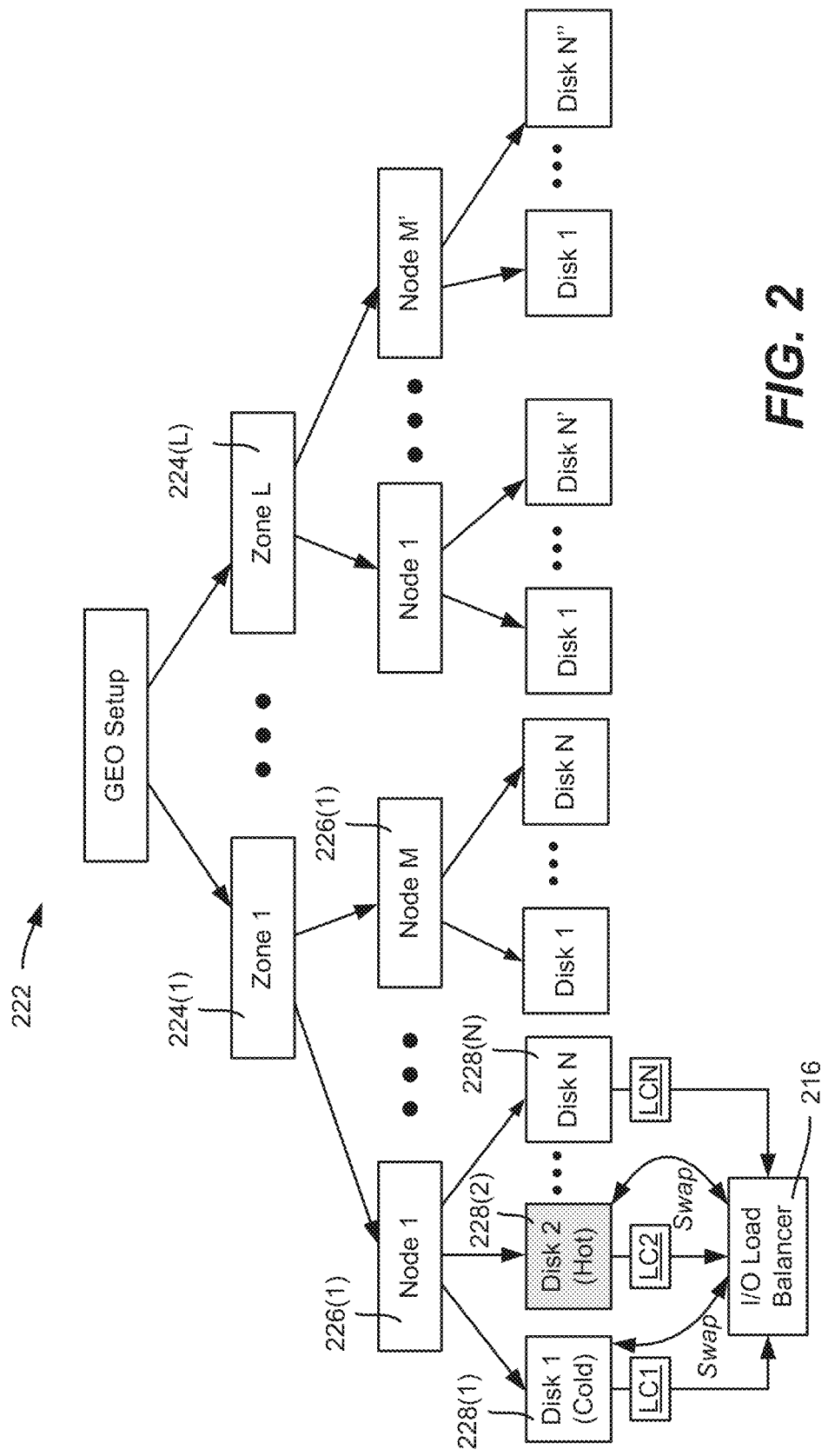
FIG. 2 is an example block diagram representation of part of a data storage system hierarchy, in which I/O load balancing can be performed by swapping hot and cold data, in accordance with various aspects and implementations of the subject disclosure.

As represented in FIG. 2, in an example implementation showing a data storage system 222 arranged as a geo-setup, comprising zones 224(1)-224(L). As further shown, the zone 224(1) comprises a cluster of nodes 226(1)-226(M).

The node 226(1) comprises disks 228(1)-228(N), with one of the disks 228(1) being a cold disk and one of the disks 228(2) being a hot disk. More particularly, the technology measures I/O load for each storage unit, which in FIG. 2 is exemplified at the disk level. To this end, load detectors comprising load counters LC1-LCN are shown coupled to the disks 228(1)-228(N) and to an instance of an I/O load balancer 216. Note that for purposes of clarity, not all nodes and/or disks are individually labeled in FIG. 2, nor are additional load counters/I/O load balancers shown; however it is understood that these components can be implemented throughout the data storage system 222.

In one implementation, the I/O load detectors are load counters without persistence. Note that it is sufficient to have a counter per disk, as I/O load of storage units at higher levels can be calculated using information about I/O load of storage units at lower levels. For instance, I/O load of a node can be calculated as a sum of I/O loads of its disks, and so on for a cluster (or subgroup) of nodes. Each load counter can, for example, count the number of I/O requests, or alternatively count the amount of data (e.g., as a number of bytes) being read/written per second or other time unit. As is understood, the measured load (e.g., what is considered relatively high or low for device) is based on a number of factors, such as storage unit type (e.g., hard disk drive (HDD) or solid state drive (SSD)), persistent memory; I/O pattern (read/write proportion), sequential or random access, and the like.

Note that I/O load balancing consumes system resources, and therefore in one implementation, I/O load thresholds are specified for a storage units' level before I/O load balancing is triggered. A first threshold value is a high load threshold limit corresponding to what is considered a considerable load threshold, by which I/O load balancing is performed only for a system that is loaded heavily enough. For example, an enterprise system may have significant imbalance over weekends, but this is not a problem because overall system load is rather low. An example high load threshold limit is eighty percent for a storage unit, however as is understood this can be adjusted as appropriate for a given data storage system, and possibly different for different parts of the data storage system, e.g., a node can have a different high load threshold limit that its disks.

A second threshold is a difference threshold, which can be a percentage load difference or a ratio. In one implementation, the active phase of I/O load balancing starts only when the difference in I/O load is considered "considerable;" an approximate high to low difference (ratio) threshold value be on the order of 1.5. As is understood, this I/O difference threshold similarly can be adjusted as appropriate for a given data storage system, and possibly different for different parts of the data storage system, e.g., a node can have an I/O difference load threshold limit that its disks.

Thus, in one implementation a storage unit (e.g. a disk) is "hot" or a "hot spot" when its I/O load is above the high load threshold limit and there is at least one peer storage unit (e.g. another disk of the same node) with an I/O load that is less than the I/O load of the first storage unit at least by the difference threshold. As described herein, identification of a hot spot triggers the active phase of I/O load balancing. Note that at this moment a "cold spot" is identified as well, that is, a peer storage unit that meets the difference threshold I/O load, e.g., relative to the hot spot.

In FIG. 2, the I/O load balancer 216 detects the hot disk 2 228(2), and further detects the existence of a peer cold disk 1 228(1). As described herein, the I/O load balancer 216 thus swaps some of the data from the hot disk 228(2) to the cold disk 228(1).

More particularly, instead of simply leveling I/O load by moving some hot data from a hot spot (storage unit 2) to a cold spot (storage unit 1), a swap is performed. This is to avoid a potential issue in which an I/O load balancer moves some data from a hot spot, and a capacity load balancer detects that the former hot spot (storage unit 2) is now under-loaded. If this occurs, the capacity load balancer will direct new, potentially hot, data to the storage unit 2, whereby the formerly hot spot may become a hot spot once again. Thus, as described herein the I/O load balancer swaps hot data from the hot spot (the disk 228(2) in the example of FIG. 2), with cold data from a cold spot (the disk 228(1) in the example of FIG. 2) until I/O balance is restored.

Notwithstanding, while swapping solves the capacity load balancing issue, an I/O load balancing mechanism that operates by straightforward swapping as generally described above still has a drawback. Indeed, straightforward swapping produces extra load on the hot spot storage resource, as a swap indicates the need to read hot data from the hot spot, which is yet another extra I/O operation. Similarly, storage of cold data to the hot spot also means an extra I/O operation, (and can even be magnified by a kind of write amplification).

Thus, instead of reading from the hot spot, the data can be obtained using a recovery path for the hot data. That is, because data storage systems such as ECS store data in a protected form, there is redundant data that can be used to recover/recreate the data, such as after its partial or complete loss. In cluster-based storage systems, the data (which can be stored in encoded fragments) and redundant data (similarly its fragments) are stored to different storage units to achieve higher data availability.

Figure 3:
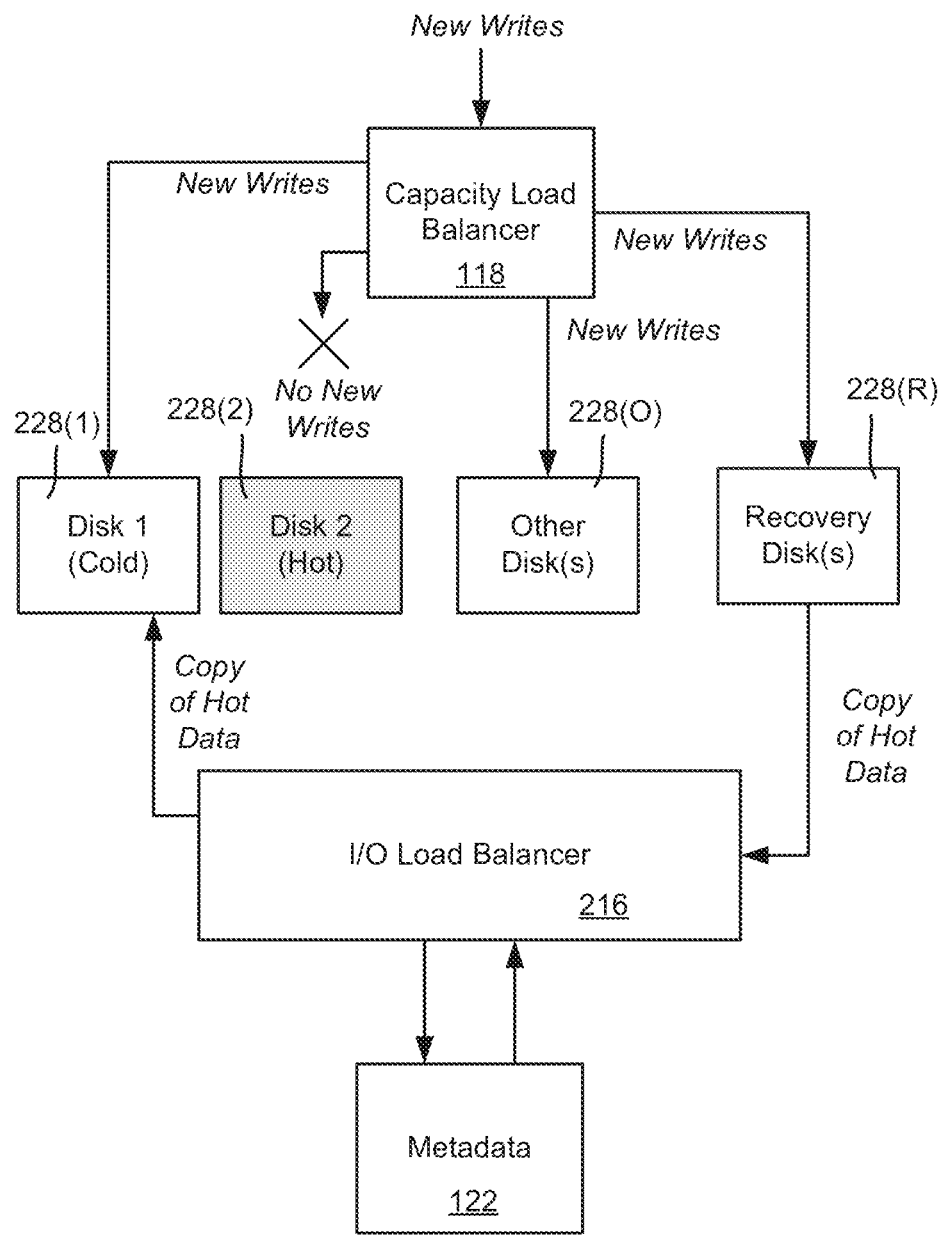
FIGS. 3 and 4 are example block diagrams representing !/O load balancing that moves a hot disk's hot data to a cold disk via a recovery path (FIG. 3) until the hot disk is no longer hot (FIG. 4), in accordance with various aspects and implementations of the subject disclosure.

Thus, in the case of hot data, the I/O load balancer can act as if the data is lost. As shown in FIG. 3, the I/O load balancer 216 can recreate ("recover") the hot data using data and/or redundant data stored to other storage units, that is, obtained via a recovery path. The recovered data, shown in FIG. 3 as a copy of the hot data obtained from one or more recovery disks 228(R), is stored to the cold storage unit, e.g., the disk 228(1). Once the disk 1 228(1) has a copy of the hot data, the relevant metadata 122 is updated by the I/O load balancer 216 (directly or via another data service coupled to the /O load balancer 216 which thereby transfers I/O access requests directed to the hot data to the disk 1 228(1).

Note that in one implementation, the recovery path is used only when doing so does not involve reads from other hot spots. In such an instance, a direct read from the hot storage unit is needed. Note that this may be as little as a data fragment, as a non-hot part of the recovery path can provide other fragments.

The problem with extra writes is avoided by temporarily preventing writes to the hot spot, that is, while it is still hot, which prevents creation of new data within it. This is shown in FIG. 3 by the "X" indicating that no new writes are allowed while the disk 2 228(2) is considered hot. The I/O load balancer 216 reduces the "temperature" (I/O load) of the disk 2 228(2) by moving hot data to the cold spot, the disk 1 228(1).

Figure 4:
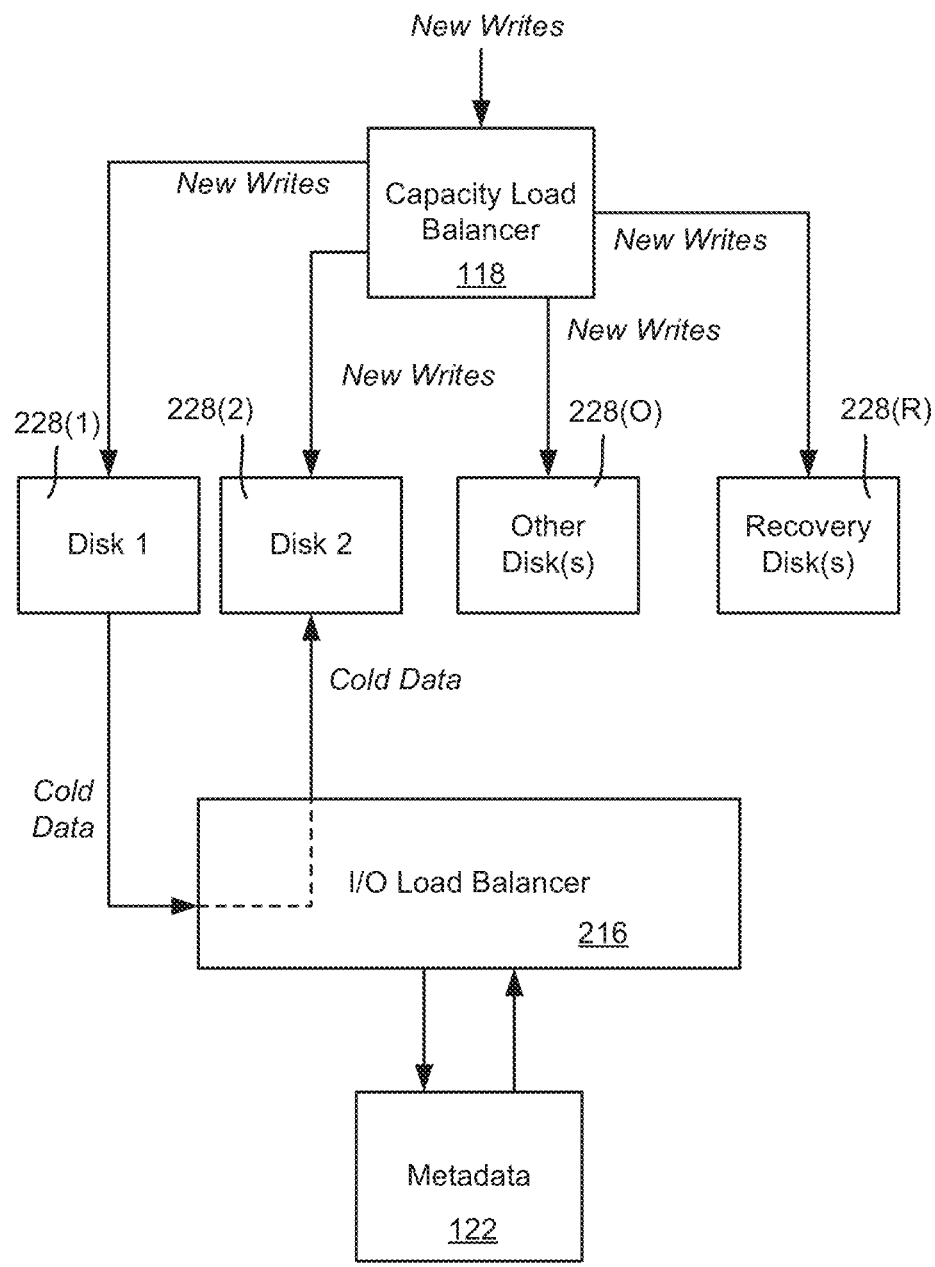

As shown in FIG. 4, only when the disk 2 228(2) is back to normal (becomes a "normal spot") with respect to I/O load, does the I/O load balancer 216 system write (swap back) cold data from the cold disk 1 228(1) to the now-normal disk 2 228(2). This restores the capacity balance as well as the I/O balance. As also shown in FIG. 4, once the I/O balance and capacity balance has been restored, the system lifts the no-write mode. In sum, there are no writes to a storage unit while it is a hot spot, but this is ordinarily only for a very short duration.

As is understood, the data portion can be logically moved from the hot storage unit to the cold storage unit, by recreating a copy of the data portion on the cold storage unit, and, by way of the metadata modification, transferring I/O data access requests that are directed to the data portion from the hot storage unit to the cold storage unit. Only if the recovery path is hot, or part thereof is hot, is there a data read from the hot storage unit. The logically moved (or read) hot data portion(s) can be deleted or subsequently garbage collected from the formerly hot storage device.

With respect to what data portion(s) get selected as hot data and cold data to swap, the constant tracking of such data portions' temperature may be unnecessary. Instead, it may be beneficial to start such tracking only after a hot spot and a cold spot are detected, and only perform hot and cold data portion tracking for the hot and cold storage units, respectively. Any suitable approach for detecting hot and cold data portions may be used. For instance, one approach is to produce an inclusion list of data portions that are requested from a hot spot during some period of time. A similar exclusion list can be produced for a cold spot. A reasonable assumption is that the requested/included data portions are hot enough and other, not requested/not excluded data portions are cold enough. An I/O load balancer may swap data portions from the inclusion list for the hot spot with data portions that are not in the exclusion list for the cold spot. The load balancer stops swapping when I/O balance is restored.

Turning to a particular implementation using ECS as an example, in ECS disk space is partitioned into a set of blocks of fixed size called chunks, which in one or more implementations are 128 megabytes in size. The various types of data, including user data and various types of metadata, are stored in chunks. There are different types of chunks, one type per capacity user. In particular, user data is stored in repository chunks, journals are stored in journal chunks, and so on, and chunks can be shared. For instance, one chunk may (and in typical cases does) contain segments of multiple user objects. A user data repository of chunks is maintained in a chunk store, managed by a storage service referred to as a chunk manager. A chunk table maintains metadata about chunks, e.g., as managed by the chunk manager. Note that directory tables and other data can also be maintained in data chunks.

A chunk can be protected with mirroring (e.g., three copies) or by erasure coding (by default, 12 data fragments+4 coding fragments). The "Geo" feature of ECS can be used to provide an additional protection of user data by means of replication to one or more different Geo zones.

The replication mechanism in ECS works at the chunks level. As a result, at the disk and the node levels, the data portions that can be swapped are chunks and chunk fragments. A chunk can be swapped with a chunk, and a chunk fragment can be swapped with a chunk fragment. A chunk also can be swapped with a set of twelve chunk fragments (assuming 12+4 erasure coding). Note that the type of a chunk (e.g., repository/journal/etc.) is irrelevant. At the cluster level, the data portions that can be swapped are repository chunks. For example, the system may swap the primary and the secondary (backup) chunk copies.

The way data swapping happens depends on the implementation. If batch mode swapping is implemented, individual chunks and fragments are not significant, as what matters is the total amount of hot and cold data to swap. There is no significant need to have the same amount of hot and cold data swapped; a size corresponding to multiple fragments is an acceptable inaccuracy that a data storage system such as ECS can easily tolerate.

It should be noted that in certain, generally infrequent circumstances, I/O load measurements can be affected, such as during data recovery operations after a failure, data rebalancing after cluster expansion, and so. In one implementation, I/O load balancing is not performed while such processes are active.

Figure 5:
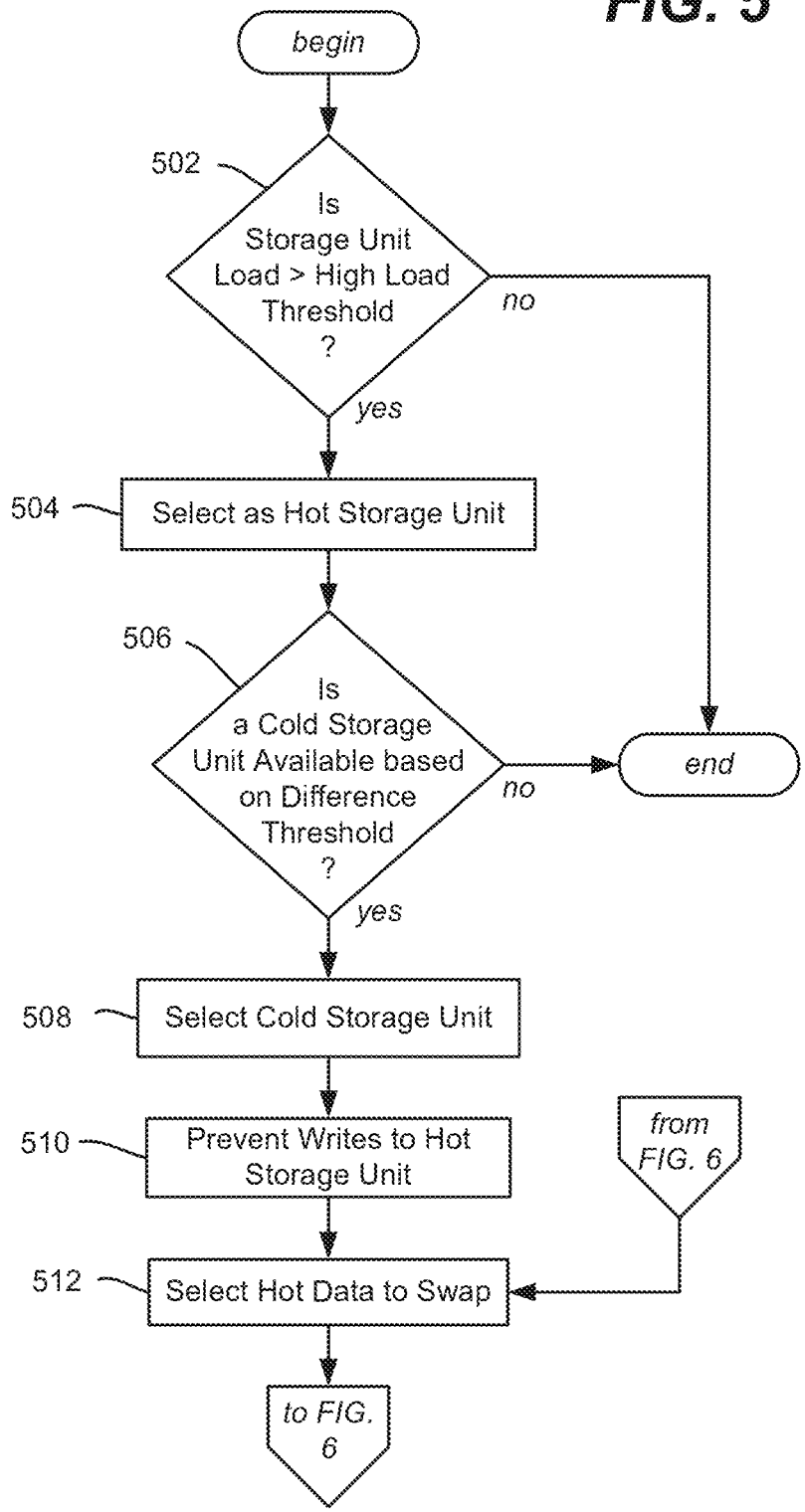
FIG. 5 and FIG. 6 comprise a flow diagram showing example operations related to I/O load balancing, in accordance with various aspects and implementations of the subject disclosure.

FIG. 5 summarizes a process/logic showing example operations related to I/O load balancing, beginning at operation 502 where a storage unit (e.g., its load counter if a disk, or summed load counters if at the node level and so on) is evaluated as to whether its I/O load exceeds the high load threshold limit. If not, the process ends with respect to this storage unit, and can continue to a next storage unit (if not already being done in parallel). Otherwise operation 504 represents selecting the storage unit as a hot storage unit.

As described herein, operation 506 represents determining whether a cold (peer) storage unit is available, e.g., based on the I/O load difference threshold value based on I/O load obtained from the other storage units' load counters as described herein. If not, the process ends until a cold storage unit is available. If so, the process continues to operation 508 to select a cold storage unit.

At this time, active load balancing is triggered; operation 510 represents preventing data writes to the hot storage unit. Operation 512 represents selecting the hot data to swap. The process continues to operation 602 of FIG. 6

Figure 6:
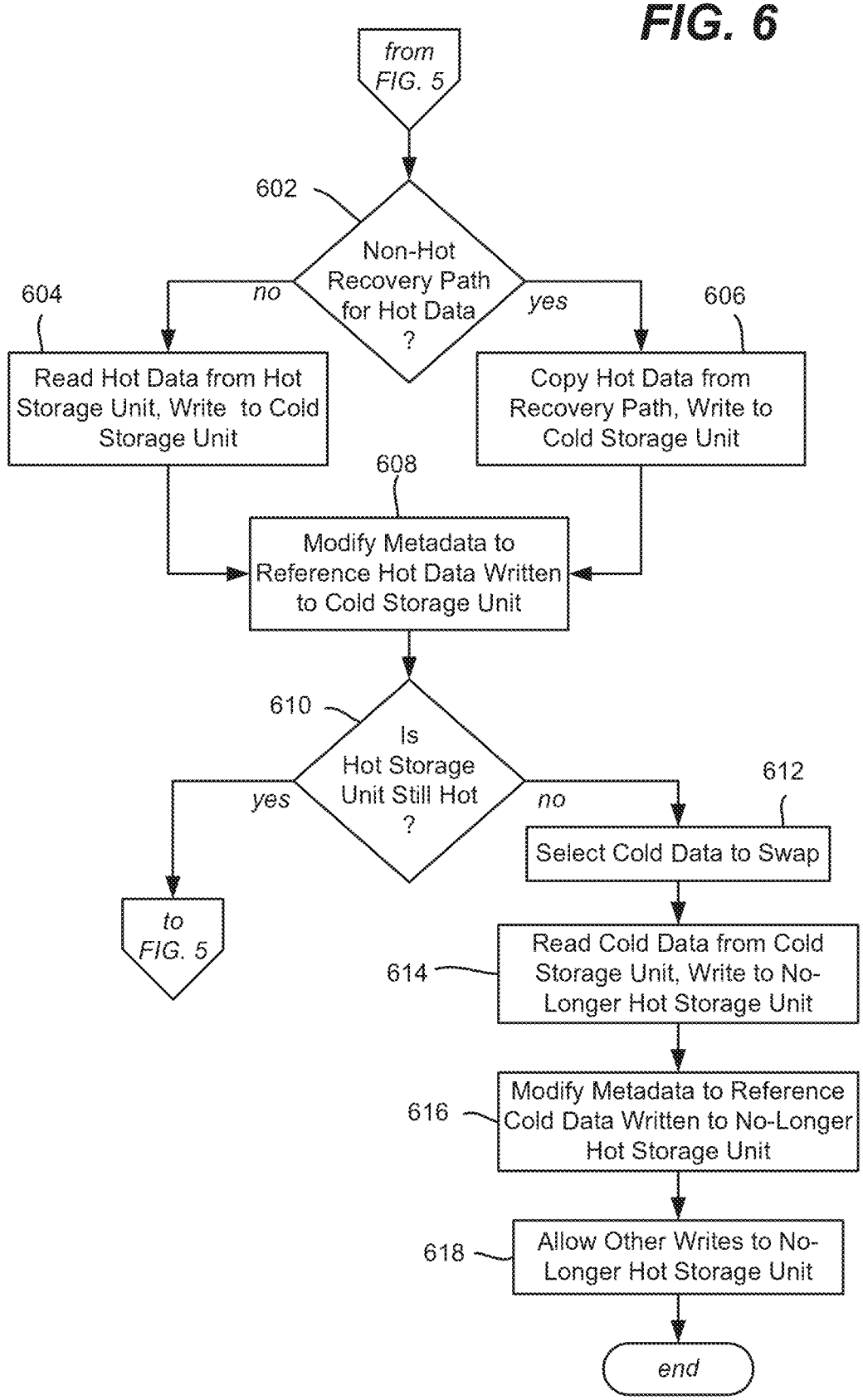

Operation 602 represents looking for a non-hot recovery path for the hot data. In the example of FIG. 6, such a path exists or not, although as set forth herein in which data fragments are distributed among different storage units, it is feasible for one part or parts of a recovery path to be hot, and another part or parts to be not hot.

If the recovery path is hot, operation 604 represents the I/O load balancer reading the hot data from the hot storage unit, and writing the hot data to the cold storage unit. If the recovery path is not hot, operation 606 represents the I/O load balancer reading (copying) the hot data from the recovery path's storage units, and writing the copy of the hot data to the cold storage unit.

Operation 608 represents the modifying of the metadata so that the cold storage unit will now be used for I/O requests to the hot data written thereto. As can be appreciated, the metadata updating is part of a transactional data write that once completed, transfers I/O access responsibility for that data to the cold storage unit from the hot storage unit.

Operation 610 evaluates whether after the data write and transfer, the hot storage unit is still hot. If not, the process returns to FIG. 5 to select another hot data portion to swap.

If the hot storage unit is no longer hot, operation 612 represents selecting the cold data to swap. Note that selection of the cold data to swap can be done earlier, but in any event the total amount of cold data should be reasonably close in size to the total hot data that was written to the cold storage unit as described herein.

Operation 614 reads the cold data from the cold storage unit, and writes it to the formerly hot storage unit. Operation 616 modifies the metadata so that I/O access to the cold-swapped data is now transferred to the formerly hot storage unit. Note that this cold data swap write is an exception to the "no-write" mode of the formerly hot storage unit.

At this time, the storage units are in capacity balance, and I/O balance with respect to neither storage unit being hot, at least for now. Operation 618 represents ending the rest of the no-write mode, that is, new writes to the formerly hot storage unit are now allowed.

It should be noted that the no-write mode can be lifted based on a different threshold value from the load-limit threshold, that is, a different "still hot or not" write threshold limit can be evaluated at operation 610. This will prevent a situation in which a storage unit being I/O load balanced just barely drops below the I/O load limit, and when new writes are allowed, jumps directly back to being considered a hot storage unit again. Notwithstanding, the same hotness threshold value can be used, on the likelihood that hot data access has been moved such that the I/O load will drop well below the I/O load limit, that is, the "write" threshold limit can be the same as the load-limit threshold used to initially determine hotness.

Figure 7:
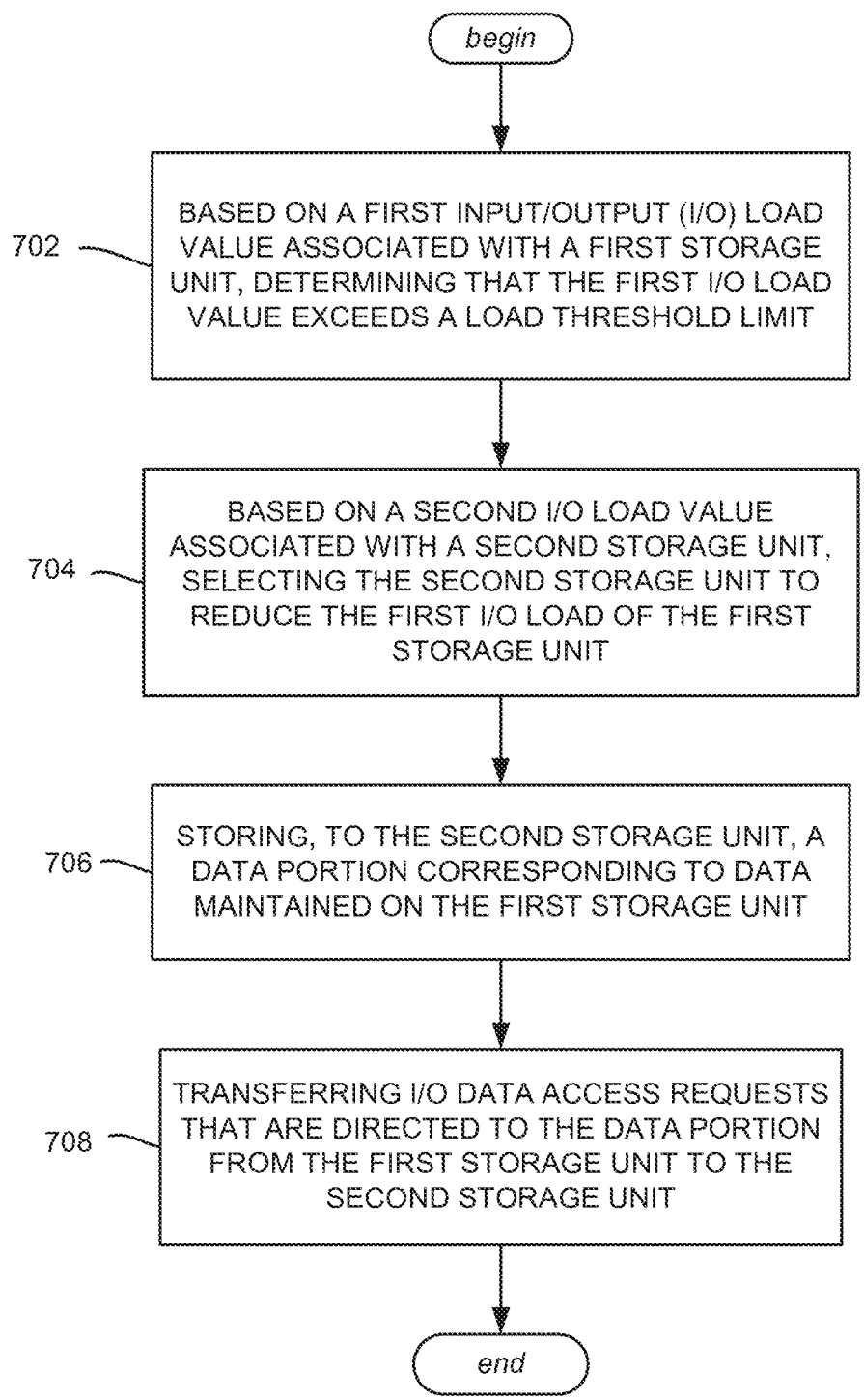
FIG. 7 is a flow diagram showing example operations related to determining an I/O overloaded storage unit, and storing data of the overloaded storage unit to a different storage unit, in accordance with various aspects and implementations of the subject disclosure.

One or more aspects can be embodied in a system, such as represented in FIG. 7, and for example can comprise a memory that stores computer executable components and/or operations, and a processor that executes computer executable components and/or operations stored in the memory. Example operations can comprise operation 702, which represents based on a first input/output (I/O) load value associated with a first storage unit, determining that the first I/O load value exceeds a load threshold limit. Operation 704 represents, based on a second I/O load value associated with a second storage unit, selecting the second storage unit to reduce the first I/O load of the first storage unit. Operation 706 represents storing, to the second storage unit, a data portion corresponding to data maintained on the first storage unit. Operation 708 represents transferring I/O data access requests that are directed to the data portion from the first storage unit to the second storage unit.

Selecting the second storage unit can comprise determining, based on the first I/O load value minus the second I/O load value, or by a ratio of the first I/O load value to the second I/O load value of the that a load difference value exceeds a threshold difference limit.

Further operations can comprise preventing data writes to the first storage unit based on the first I/O load value exceeding the load threshold limit, and allowing data writes to the first storage unit based on the first I/O load value being below a data write threshold limit. The data portion can be a first data portion, and further operations can comprise writing a second data portion from the second storage unit to the first storage unit, and transferring I/O data access requests that are directed to the second data portion from the second storage unit to the first storage unit.

Storing the data portion to the second storage unit can comprise recreating the data portion from redundant data maintained on a group of one or more storage units, in which the group does not include the first storage unit.

Storing the data portion to the second storage unit can comprise determining that redundant data maintained on a group of one or more storage units is not to be used to recreate the data on the second storage based on at least one storage unit in the group having a high I/O load according to a high load criterion, and in response to the determining, reading the data portion from the first storage unit.

The first and second storage units can be disks, and the data portion can comprise a chunk. The first and second storage units can be disks, and the data portion can comprise one or more chunk fragments.

The first and second storage units can be nodes of a node cluster, and the data portion can comprise a chunk. The first and second storage units can be nodes of a node cluster, and the data portion can comprise one or more chunk fragments.

The first storage unit can corresponds to a first cluster, the second storage unit can correspond to a second cluster, and wherein the storing the data portion comprises storing a repository chunk.

Figure 8:
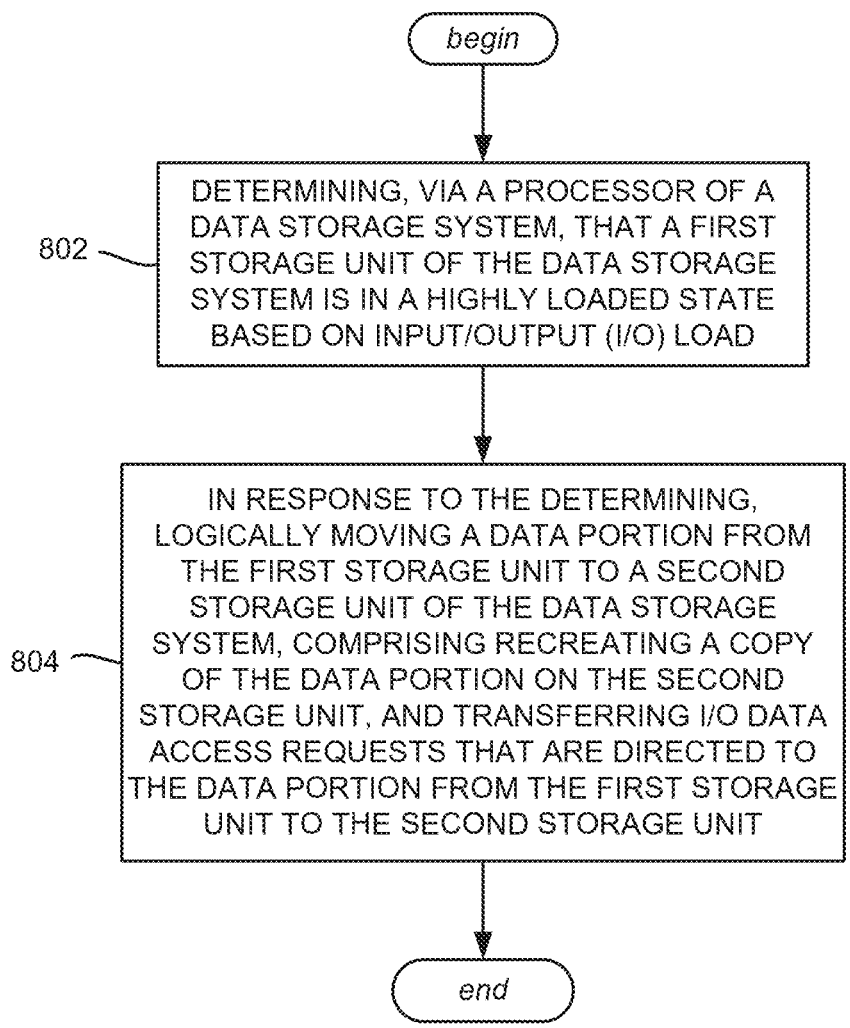
FIG. 8 is an example flow diagram showing example operations related to determining a storage unit in a highly loaded state, and logically moving a data portion to another storage unit by recreating a copy of the data on the other storage unit, in accordance with various aspects and implementations of the subject disclosure.

One or more example aspects, such as corresponding to example operations of a method, are represented in FIG. 8. Operation 802 represents determining, via a processor of a data storage system, that a first storage unit of the data storage system is in a highly loaded state based on input/output (I/O) load. Operation 804 represents, in response to the determining, logically moving a data portion from the first storage unit to a second storage unit of the data storage system, comprising recreating a copy of the data portion on the second storage unit, and transferring I/O data access requests that are directed to the data portion from the first storage unit to the second storage unit.

Determining that the first storage unit is in the highly loaded state with input/output (I/O) load can comprise evaluating an I/O load counter maintained in association with the first storage unit.

The first storage unit can be highly loaded with first I/O load; aspects can comprise selecting the second storage unit based on a second I/O load of the second storage unit relative to the first I/O load.

Aspects can comprise preventing data writes to the first storage unit while the first storage unit is in the highly loaded state.

Aspects can comprise moving data from the second storage unit to the first storage unit in response to the first storage unit being determined no longer to be in the highly loaded state.

Recreating the copy of the data portion can comprise recovering the data portion to the second storage unit using recovery data stored on one or more other storage units.

Recreating the copy of the data portion on the second storage unit can comprise at least one of: recreating a chunk or recreating one or more chunk fragments.

Figure 9:
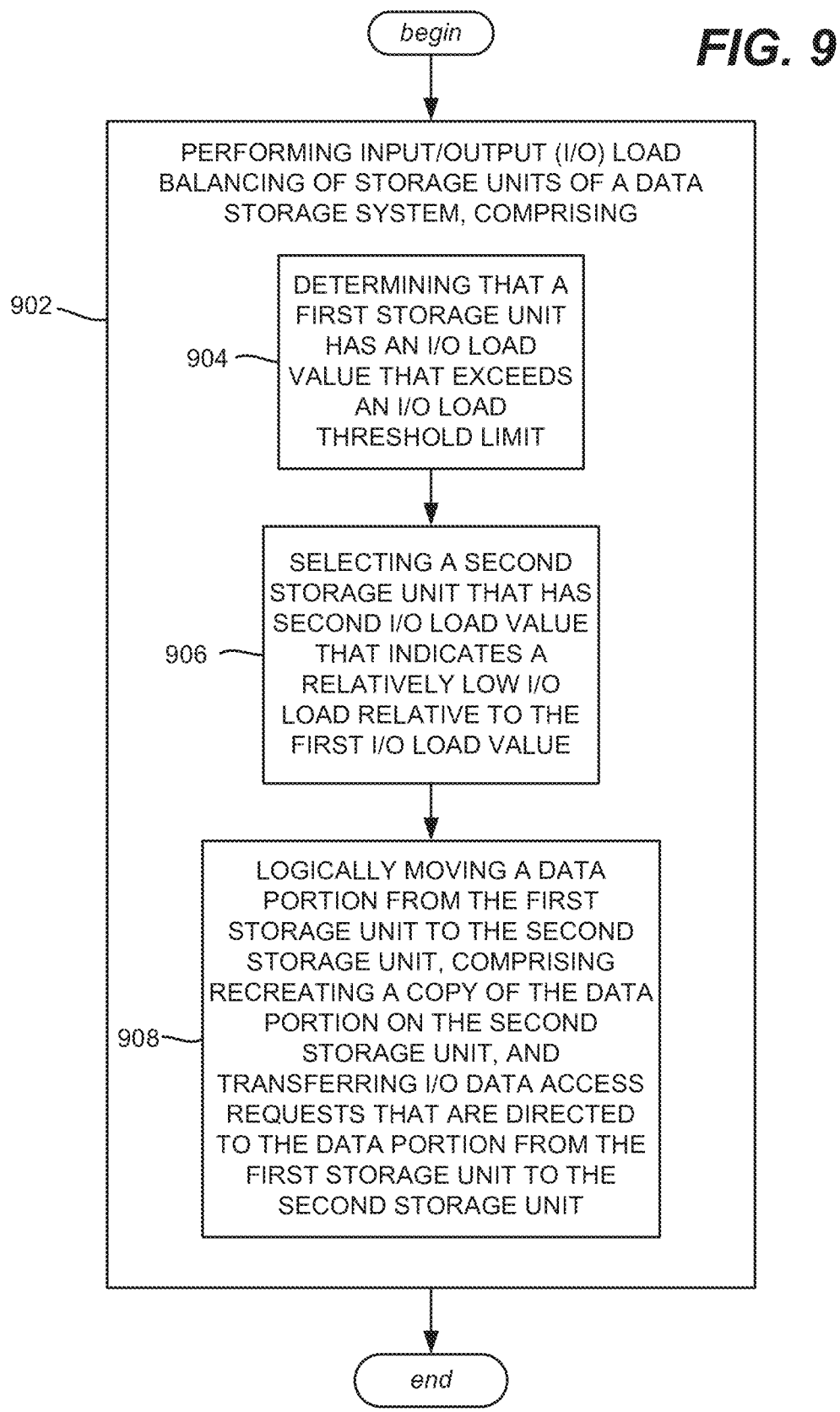
FIG. 9 is an example flow diagram showing example operations related to performing input/output (I/O) load balancing of storage units of the data storage system, in accordance with various aspects and implementations of the subject disclosure.

FIG. 9 summarizes various example operations, e.g., corresponding to a machine-readable storage medium, comprising executable instructions that, when executed by a processor of a data storage system, facilitate performance of operations. Operation 902 represents performing input/output (I/O) load balancing of storage units of the data storage system. Aspects of operation 902 can comprise determining that a first storage unit has an I/O load value that exceeds an I/O load threshold limit (operation 904), selecting a second storage unit that has second I/O load value that indicates a relatively low I/O load relative to the first I/O load value (operation 906), and logically moving a data portion from the first storage unit to the second storage unit, comprising recreating a copy of the data portion on the second storage unit, and transferring I/O data access requests that are directed to the data portion from the first storage unit to the second storage unit (operation 908).

The data portion can be a first data portion, and further operations can comprise preventing data writes to the first storage unit while the first load value is above a data write threshold limit, and allowing data writes to the first storage unit when the first load value is no longer above the data write threshold limit.

As can be seen, described herein is technology for mitigate the problems of I/O overloaded storage units (hot spots) in data storage systems. The technology can do so without creation of a capacity load imbalance or other similar problems).

Figure 10:
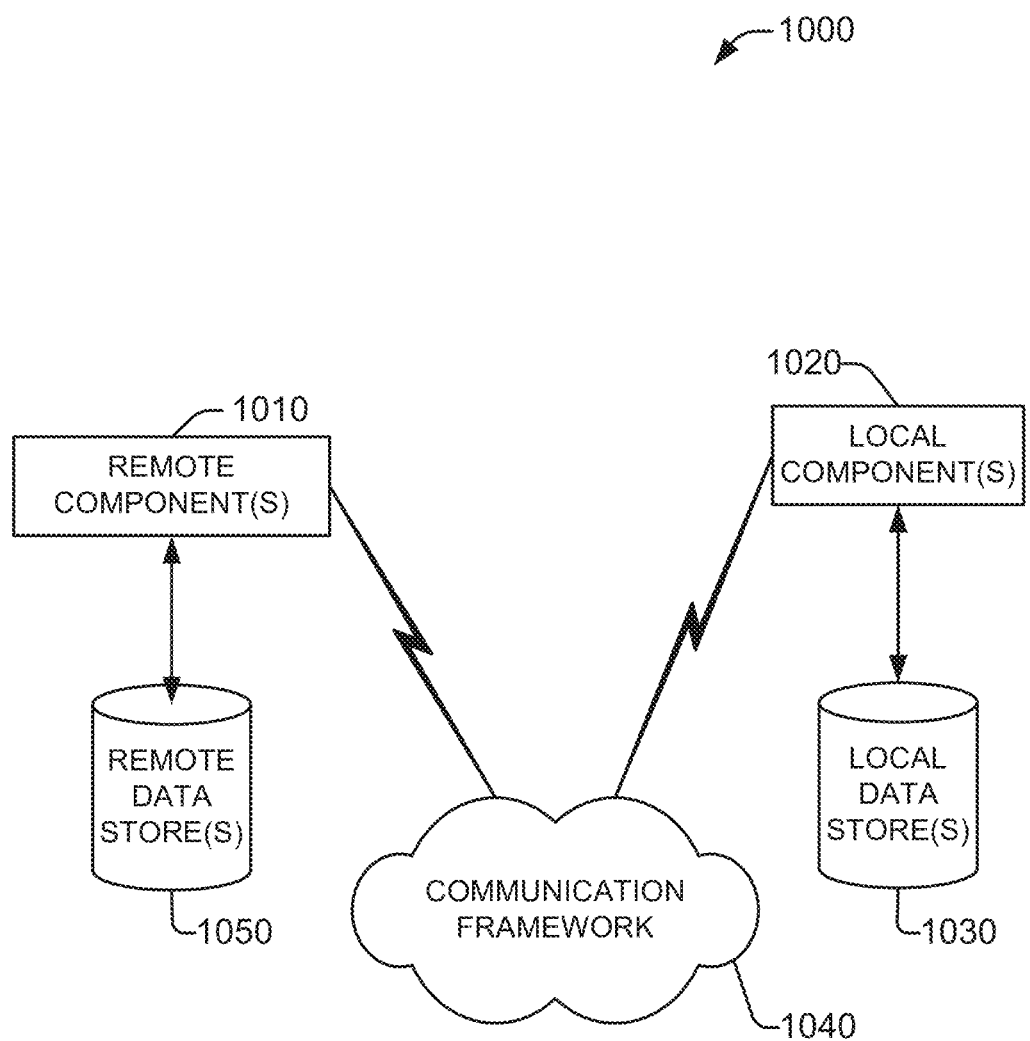
FIG. 10 is a block diagram representing an example computing environment into which aspects of the subject matter described herein may be incorporated.

FIG. 10 is a schematic block diagram of a computing environment 1000 with which the disclosed subject matter can interact. The system 1000 comprises one or more remote component(s) 1010. The remote component(s) 1010 can be hardware and/or software (e.g., threads, processes, computing devices). In some embodiments, remote component(s) 1010 can be a distributed computer system, connected to a local automatic scaling component and/or programs that use the resources of a distributed computer system, via communication framework 1040. Communication framework 1040 can comprise wired network devices, wireless network devices, mobile devices, wearable devices, radio access network devices, gateway devices, femtocell devices, servers, etc.

The system 1000 also comprises one or more local component(s) 1020. The local component(s) 1020 can be hardware and/or software (e.g., threads, processes, computing devices). In some embodiments, local component(s) 1020 can comprise an automatic scaling component and/or programs that communicate/use the remote resources 1010 and 1020, etc., connected to a remotely located distributed computing system via communication framework 1040.

One possible communication between a remote component(s) 1010 and a local component(s) 1020 can be in the form of a data packet adapted to be transmitted between two or more computer processes. Another possible communication between a remote component(s) 1010 and a local component(s) 1020 can be in the form of circuit-switched data adapted to be transmitted between two or more computer processes in radio time slots. The system 1000 comprises a communication framework 1040 that can be employed to facilitate communications between the remote component(s) 1010 and the local component(s) 1020, and can comprise an air interface, e.g., Uu interface of a UMTS network, via a long-term evolution (LTE) network, etc. Remote component(s) 1010 can be operably connected to one or more remote data store(s) 1050, such as a hard drive, solid state drive, SIM card, device memory, etc., that can be employed to store information on the remote component(s) 1010 side of communication framework 1040. Similarly, local component(s) 1020 can be operably connected to one or more local data store(s) 1030, that can be employed to store information on the local component(s) 1020 side of communication framework 1040.

Figure 11:
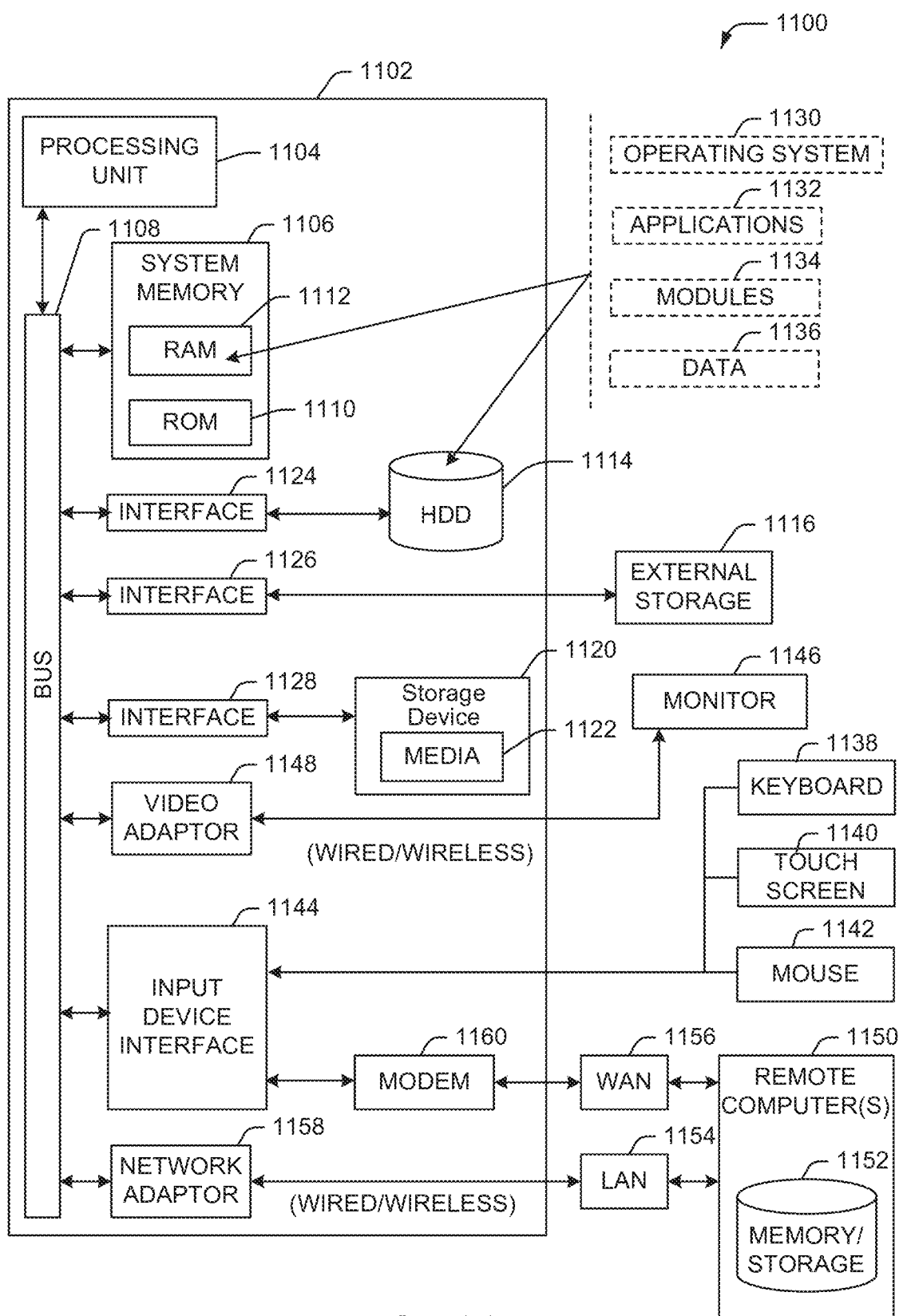
FIG. 11 depicts an example schematic block diagram of a computing environment with which the disclosed subject matter can interact/be implemented at least in part, in accordance with various aspects and implementations of the subject disclosure.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), and can include one or more external storage devices 1116 (e.g., a magnetic floppy disk drive (FDD) 1116, a memory stick or flash drive reader, a memory card reader, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114.

Other internal or external storage can include at least one other storage device 1120 with storage media 1122 (e.g., a solid state storage device, a nonvolatile memory device, and/or an optical disk drive that can read or write from removable media such as a CD-ROM disc, a DVD, a BD, etc.). The external storage 1116 can be facilitated by a network virtual machine. The HDD 1114, external storage device(s) 1116 and storage device (e.g., drive) 1120 can be connected to the system bus 1108 by an HDD interface 1124, an external storage interface 1126 and a drive interface 1128, respectively.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enable with a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed.

While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather is to be construed in breadth, spirit and scope in accordance with the appended claims.

What is claimed is:

1. A system, comprising:
a processor; and
a memory that stores executable instructions that, when executed by the processor, facilitate performance of operations, the operations comprising:
based on a first input/output (I/O) load value associated with a first storage unit, determining that the first I/O load value exceeds a load threshold limit;
based on a second I/O load value associated with a second storage unit, selecting the second storage unit to reduce the first I/O load of the first storage unit;
identifying a third storage unit that stores recovery data for the first storage unit and is not engaged in a data recovery operation using the recovery data;
storing, to the second storage unit, a data portion corresponding to data maintained on the first storage unit, wherein recreating a copy of the data portion comprises copying the data portion to the second storage unit using the recovery data stored on the third storage unit; and
transferring I/O data access requests that are directed to the data portion from the first storage unit to the second storage unit.

2. The system of claim 1, wherein the selecting the second storage unit comprises determining, based on the first I/O load value minus the second I/O load value, or based on a ratio of the first I/O load value to the second I/O load value, that a load difference value exceeds a threshold difference limit.

3. The system of claim 1, wherein the operations further comprise preventing data writes to the first storage unit based on the first I/O load value exceeding the load threshold limit, and allowing data writes to the first storage unit based on the first I/O load value being below a data write threshold limit.

4. The system of claim 3, wherein the data portion is a first data portion, and wherein the operations further comprise writing a second data portion from the second storage unit to the first storage unit, and transferring I/O data access requests that are directed to the second data portion from the second storage unit to the first storage unit.

5. The system of claim 1, wherein the recovery data comprises backup data maintained on a group of one or more storage units, in which the group comprises the third storage unit and does not comprise the first storage unit.

6. The system of claim 1, wherein the storing the data portion to the second storage unit comprises determining that redundant data maintained on a group of one or more storage units is not to be used to recreate the data on the second storage based on at least one storage unit in the group having a high I/O load according to a high load criterion, and in response to the determining, reading the data portion from the first storage unit.

7. The system of claim 1, wherein the first and second storage units are disks, and wherein the data portion comprises a chunk.

8. The system of claim 1, wherein the first and second storage units are disks, and wherein the data portion comprises one or more chunk fragments.

9. The system of claim 1, wherein the first and second storage units are nodes of a node cluster, and wherein the data portion comprises a chunk.

10. The system of claim 1, wherein the first and second storage units are nodes of a node cluster, and wherein the data portion comprises one or more chunk fragments.

11. The system of claim 1, wherein the first storage unit corresponds to a first cluster, wherein the second storage unit corresponds to a second cluster, and wherein the storing the data portion comprises storing a repository chunk.

12. A method, comprising:
  determining, via a processor of a data storage system, that a first storage unit of the data storage system is in a highly loaded state based on input/output (I/O) load;
  identifying a recovery storage unit that stores recovery data for the first storage unit and is not engaged in a data recovery operation using the recovery data; and
  in response to the determining, logically moving a data portion from the first storage unit to a second storage unit of the data storage system, comprising recreating a copy of the data portion on the second storage unit, and transferring I/O data access requests that are directed to the data portion from the first storage unit to the second storage unit, wherein the recreating the copy of the data portion comprises copying the data portion to the second storage unit using the recovery data stored on the recovery storage unit.

13. The method of claim 12, wherein the determining that the first storage unit is in the highly loaded state with input/output (I/O) load comprises evaluating an I/O load counter maintained in association with the first storage unit.

14. The method of claim 12, wherein the first storage unit is highly loaded with first I/O load, and further comprising selecting the second storage unit based on a second I/O load of the second storage unit relative to the first I/O load.

15. The method of claim 12, further comprising preventing data writes to the first storage unit while the first storage unit is in the highly loaded state.

16. The method of claim 15, further comprising moving data from the second storage unit to the first storage unit in response to the first storage unit being determined no longer to be in the highly loaded state.

17. The method of claim 12, wherein the recovery data comprises backup data stored on one or more other storage units comprising the recovery unit.

18. The method of claim 12, wherein the recreating the copy of the data portion on the second storage unit comprises at least one of: recreating a chunk or recreating one or more chunk fragments.

19. A non-transitory machine-readable medium, comprising executable instructions that, when executed by a processor of a data storage system, facilitate performance of operations, the operations comprising:
  performing input/output (I/O) load balancing of storage units of the data storage system, comprising,
    determining that a first storage unit has an I/O load value that exceeds an I/O load threshold limit;
    selecting a second storage unit that has second I/O load value that indicates a relatively low I/O load relative to the first I/O load value;
    selecting a third storage unit that stores recovery data for the first storage unit and is not engaged in a data recovery operation using the recovery data; and
    logically moving a data portion from the first storage unit to the second storage unit, comprising recreating a copy of the data portion on the second storage unit, and transferring I/O data access requests that are directed to the data portion from the first storage unit to the second storage unit, wherein the recreating the copy of the data portion comprises copying the data portion to the second storage unit using the recovery data.

20. The non-transitory machine-readable storage medium of claim 19, wherein the data portion is a first data portion, and wherein the operations further comprise preventing data writes to the first storage unit while the first load value is above a data write threshold limit, and allowing data writes to the first storage unit when the first load value is no longer above the data write threshold limit.

* * * * *